2 Sheets--Sheet 1.

W. H. WARREN.

Metal Shaping-Machines.

No. 5,739. Reissued Jan. 20, 1874.

Witnesses.

Thos. H. Dodge.

Chas. H. Burleigh.

Inventor.

W. H. Warren.

W. H. WARREN.

Metal Shaping-Machines.

No. 5,739.

Reissued Jan. 20, 1874.

Witnesses.
Thos. H. Dodge
Chas. H. Burleigh

Inventor.
W. H. Warren

UNITED STATES PATENT OFFICE.

WILLIAM H. WARREN, OF WORCESTER, MASSACHUSETTS, ASSIGNOR, BY MESNE ASSIGNMENTS, TO THE WOOD & LIGHT MACHINE COMPANY, OF SAME PLACE.

IMPROVEMENT IN METAL-SHAPING MACHINES.

Specification forming part of Letters Patent No. 113,824, dated April 18, 1871; reissue No. 5,739, dated January 20, 1874; application filed October 25, 1873.

*To all whom it may concern:*

Be it known that I, WILLIAM H. WARREN, of the city and county of Worcester and State of Massachusetts, have invented certain new and useful Improvements in Shaping-Machines; the following is a description of the same, reference being had to the accompanying drawings, which form a part of this specification.

Figure 1:
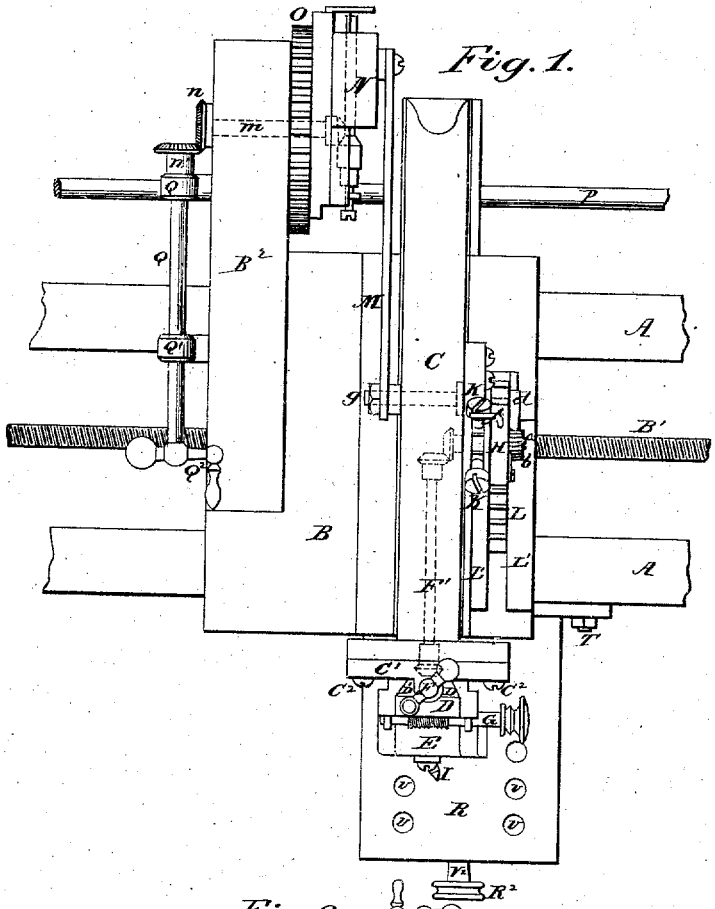
Figure 2:
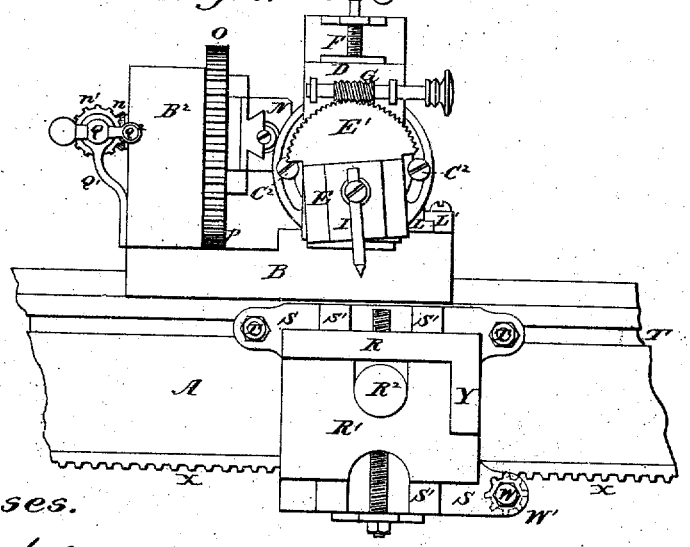
Figure 3:
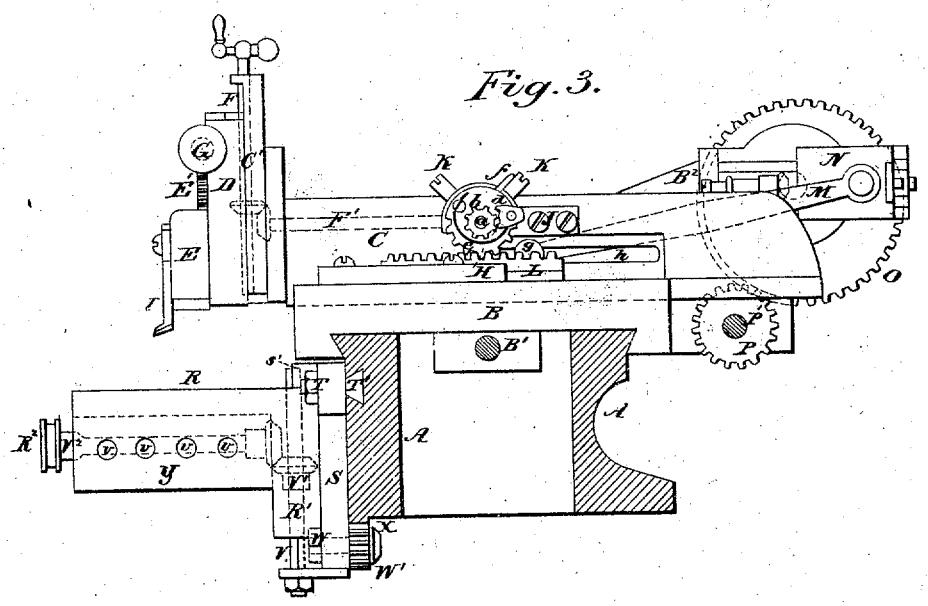
Figure 4:
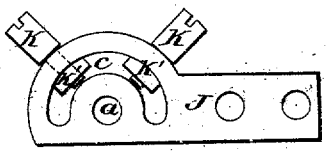

Figure 1 represents a plan view of so much of a shaping-machine as is necessary to illustrate my improvements. Fig. 2 represents a front view. Fig. 3 represents a view of the right-hand side; and Fig. 4 represents, upon an enlarged scale, a view of the adjustable stops.

In the drawings, the parts marked A represent the main frame, upon the top of which is arranged the saddle or carriage B, supported by suitable ways, so that it can be run to the right or left by means of the screw $B^1$, in the ordinary manner. Upon the carriage B is arranged the reciprocating slide C, which carries the head-block D and tool-rest E. The slide C is provided with an adjustable circular head, $C^1$, to which the head-block D is united by means of guideways $D'$ at the front side of the head $C^1$, and upon which the head-block D may be moved up and down by the action of the screw F, arranged in an upright position on the head $C^1$ between the ways $D'$. The head $C^1$ is attached to the end of the reciprocating slide C by means of the screws or bolts $C^2$, which pass through segmental slots formed in the head $C^1$, as shown in Fig. 2. By loosening the bolts or screws $C^2$, the head $C^1$ can be easily turned upon its center, so that the screw F and the ways $D'$ will stand in an angular or oblique position.

The screw F is connected for operation, by means of a pair of bevel-gears, to a horizontal shaft, $F'$, within the slide C, as indicated by dotted lines in Figs. 1 and 3. The shaft $F'$ is arranged parallel with the axis of the slide C, and the gear upon its front end forms a center, around which the head $C^1$ is swung when moved to an oblique position.

The tool-rest E is pivoted to the central of the head-block D, and is provided with a toothed segment, $E'$, at its upper part, by means of which, in connection with the screw G, the rest E can be swung to the right or left to properly adjust the cutting-tool I.

As represented in the drawings, the shaft $F'$ is actuated by a feeding device at the side of the reciprocating slide C, which operates the screw F and feeds the head-block D, which carries the cutting-tool I, in a downward or diagonal direction, according to the position of the head $C^1$.

This feeding device consists of a short shaft, *a*, arranged at a right angle to the shaft $F'$, to which it is connected for operation by bevel-gears, the positions of which are indicated by the dotted lines in Fig. 1. The outer end of the shaft *a* is furnished with a ratchet-wheel, *b*, rigidly keyed to its extremity, and a segment-gear, H, which is hung loose on said shaft just inside of the ratchet-wheel. A pawl, *d*, is pivoted to the side of the segment-gear H, which engages with the notches of the ratchet-wheel when the machine is in motion, and thereby moves the shaft *a*. The shaft *a* is supported and turns in a crescent-shaped bearing-piece, J, which is secured to the side of the reciprocating slide C. A semicircular slot, *c*, is formed through the bearing-piece J, and it is also slotted vertically through its upper part. Arranged in the vertical slot are two stop-screws, K, which screw into the nuts $K'$ in the semicircular slot *c*, as shown in Fig. 4. By loosening the screws and sliding the nuts along the slot *c*, the stops may be adjusted to different positions, as desired. A pin or finger, *f*, is set in the top of the segment-gear H, which strikes the stops K and stops the motion of the gear H.

Instead of using screws for the stops K, lugs may be secured to the top of the bearing-piece J, the ends of which will project over the edge of the segment-gear H, in which case the finger *f* could be made quite short.

The segment-gear H meshes into and is operated by a rack, L, arranged upon the carriage B, as indicated, supported between the guides $L'$, which subject the rack L to sufficient friction to enable it to turn the segment-gear H until the finger comes into contact with one of the stop-screws K, after which the rack L slides along between the guides L′ with the motion of the slide C.

The reciprocating slide C is moved back and forth by a pitman, M, actuated by an adjustable crank device, N, which device is made in accordance with my invention, for which Letters Patent were granted to me January 14, 1868.

The forward end of the pitman M is secured by a pivot-bolt, *g*, in a longitudinal slot, *h*, formed through the slide C, as shown in Fig. 3, whereby it can be readily adjusted to different positions, as desired.

The crank device N is attached to the side of a large gear, O, which meshes into and is operated by a pinion, P, on the driving-shaft P′ at the back of the machine. The crank device N and gear O are supported by a projecting portion, $B^2$, of the carriage B.

The spindle *m*, by which the crank is adjusted, extends through the bearing-block $B^2$, and, in order to be operated from the front of the machine, may be provided, at its end, with a bevel-gear, *n*, which meshes into a corresponding gear, *n′*, on the end of a trunnion-shaft, Q, arranged in the bearings $Q^1$ at the side of the carriage B, as shown in Figs. 1 and 2. The shaft Q being furnished with a hand-crank, $Q^2$, at the front end, the operator is able to adjust the crank device N in a very convenient and accurate manner without stopping the machine.

At the front of the main frame A is arranged the work-supporting table R, the back $R^1$ of which is grooved and fitted to the ways S′, upon a vertical carriage, S, this carriage being secured to the front part of the frame A by means of clamp-bolts T, the heads of which are fitted into and held in the longitudinal groove T′, formed in the frame A, as shown in Fig. 3. This table R can be conveniently raised or depressed by means of a shaft, $V^2$, worked by the hand-wheel $R^2$, and operating the bevel-gear on the end of the shaft $V^2$, meshing into the bevel-gear nut $V^1$, to which the table is secured, which nut $V^1$ works on the screw V, which saves the trouble of stooping to reach a wheel at the lower end of the screw V, as is the case with machines of previous construction. At the lower part of the vertical carriage S is a spindle or bolt, W, which passes through the carriage-frame, and is provided at its rear end with a pinion, W′, which meshes with a rack, X, on the lower edge of the main frame A.

By placing a wrench upon the head of the bolt or spindle W, and turning the pinion W′, the carriage S and table R can be easily run along the front of the machine to bring it into any desired position, when it can then be secured by turning up the nuts on the clamp-bolts T.

The table R is formed with a downward return, Y, at one side, to which certain pieces of work can be readily secured in an upright position, when necessary, by the holes *q*, as shown in Fig. 3, similar holes being formed in the horizontal face of the table R to secure work in that position.

The operation of my machine is as follows: The work being secured to the table R and the cutting-tool I adjusted, the head C′ being set upright or inclined, as needed for the work, and power being applied, the slide C is moved back and forth by the crank N moving the pitman M, thereby carrying the tool I back and forth over the work. As the slide C moves to the front, the segment-gear H is caused to roll forward, carrying the pawl *d* over the ratchet *b* until the finger *f* strikes the front stop-screw K, which prevents its further motion, and causes it to overcome the friction, and to slide forward the rack L throughout the remainder of the distance traversed by the slide C. As the slide C moves backward, the spring *c* causes the pawl *d* to engage the ratchet *b*, and as the segment-gear H is rolled back, the shaft *a* is revolved, and, turning the shaft F′ within the slide C, transmits motion to the screw F, and thereby feeds down the head-block D and the tool I, either vertically or diagonally, as the head $C^1$ is set. When the segment-gear H has rolled back sufficiently far to bring the finger *f* in contact with the rear stop-screw K its motion is stopped, and the rack L caused to slide for the remainder of the distance, as before.

It will be observed that my feeding device will act with equal facility, whether the head $C^1$ is in an upright or inclined position.

The feed-screw F can also be operated by hand, when desired, by throwing the pawl *d* out of clutch with the ratchet-wheel *b*, and turning the screw by means of the crank at its upper end.

The friction may be applied to the rack L in any convenient manner; or, if preferred, the segment-gear H can be made in the form of a smooth-faced roll, and the friction applied directly to its place. I prefer, however, the arrangement shown in the drawing.

Having described my improved shaping-machine, what I claim therein as new and of my invention, and desire to secure by Letters Patent, is—

1. The combination, with the reciprocating slide C and head-block D, which carries the cutting-tool, of the automatic feeding device, consisting of the parts F, F′, *a*, *b*, H, *d*, J, K, *f*, L, and L′, arranged, in relation to each other, substantially as shown, and for the purposes set forth.

2. The combination, with the frame A and table R Y $R^1$ of a shaping-machine, of the spindle W, with the pinion W′, meshing into the rack X on the lower edge of the main frame A, for the purpose of moving the table along the front of the machine in a horizontal direction, substantially as shown, and for the purpose set forth.

3. The improved shaping-machine herein described, consisting essentially of the adjustable crank device, a crank-shaft for changing the length of stroke, the adjustable automatic down and angular tool-feeding devices, the bevel-gear arrangement for raising and lowering the table on the screw, and the rack-and-pinion arrangement for moving the table along the front of the machine in a horizontal direction, all arranged substantially as represented, and operating as set forth.

Worcester, October 22, 1873.

W. H. WARREN.

Witnesses:

O. S. BATCHELDER,
F. E. REED.